United States Patent
Matsubayashi et al.

(10) Patent No.: US 6,669,877 B2
(45) Date of Patent: Dec. 30, 2003

(54) MALFUNCTION-DETECTING METHOD IN INJECTION MOLDING MACHINES

(75) Inventors: Haruyuki Matsubayashi, Numazu (JP); Akira Kanda, Numazu (JP); Takamitsu Yamashita, Numazu (JP); Takashi Yamazaki, Mishima (JP); Yukio Iimura, Shizuoka-ken (JP); Yutaka Yamaguchi, Shizuoka-ken (JP); Masamitsu Suzuki, Numazu (JP)

(73) Assignee: Toshiba Machine Co., Ltd., Tokyo (JP)

( * ) Notice: Subject to any disclaimer, the term of this patent is extended or adjusted under 35 U.S.C. 154(b) by 45 days.

(21) Appl. No.: 09/899,275

(22) Filed: Jul. 6, 2001

(65) Prior Publication Data

US 2002/0005599 A1 Jan. 17, 2002

(30) Foreign Application Priority Data

Jul. 11, 2000  (JP) ........................................ 2000-210405

(51) Int. Cl.⁷ ........................... B29C 45/76; B29C 45/80
(52) U.S. Cl. ..................... 264/40.1; 264/40.4; 425/136; 425/139; 425/165; 425/169
(58) Field of Search ............................... 264/40.1, 40.4; 425/139, 165, 169, 136

(56) References Cited

U.S. PATENT DOCUMENTS 5,492,658 A * 2/1996 Ohno et al. ................ 264/40.1
6,398,536 B2 * 6/2002 Onishi ......................... 425/136

* cited by examiner

*Primary Examiner*—Michael Colaianni
*Assistant Examiner*—Monica A Fontaine
(74) *Attorney, Agent, or Firm*—Pillsbury Winthrop LLP

(57) ABSTRACT

This invention provides a method which makes it possible to reliably detect malfunctions during the ejecting step without rendering the injection molding machine more complicated. An ejector pin is incorporated in the movable die. This ejector pin is connected, via an ejector plate, a connecting rod, a connecting plate and a feed screw, with a servo motor. The force for ejecting the ejector pin pushing a molded product is measured from the driving torque of a servo motor. In this invention, the relationship between driving torque and elapsed time from the initiation of ejection of the molded product is stored as a reference pattern. The tolerance limit and monitoring interval of driving torque are preset relative to the reference pattern. When the value of driving torque falls outside the tolerance limit during the ejecting step, it is judged as a malfunction, and an alarm is generated to stop the machine in a safe state.

6 Claims, 3 Drawing Sheets

MALFUNCTION-DETECTING METHOD IN INJECTION MOLDING MACHINES

CROSS-REFERENCE TO RELATED APPLICATIONS

This application is based upon and claims the benefit of priority from the prior Japanese Patent Application No. 2000-210405, filed Jul. 11, 2000, the entire contents of which are incorporated herein by reference.

BACKGROUND OF THE INVENTION

This invention relates to a method of detecting malfunctions during the ejecting step of removing molded products from a mold in a motorized or hydraulic injection molding machine.

Injection molding machines are generally operated as follows. First of all, the mold thereof is clamped, and then, a melted material is injected from the injection unit into a mold. Then, after the resin is sufficiently freezed, the releasing of mold is performed. After the releasing of mold, an ejector pin incorporated inside a movable die is allowed to protrude from the inner wall of the die so as to push the molded product out of the die. With respect to this ejecting step, it has been conventionally practiced such that the ejecting speed, ejecting force and stroke of the ejector pin, etc. are set in advance by the operator. However, with regard to the evaluation of the result of product removal from the mold, the measures that have been taken according to the prior art were simply to confirm the ejecting stroke of ejector pin, thus omitting any other automatic evaluation of the result of removal of the molded product.

As mentioned above, according to the control system of the conventional injection molding machine, if only the advancing movement of the ejector pin up to a preset stroke can be confirmed in the ejecting step, the ejecting step is judged as being normally finished, thus enabling the injection molding machine to start the next mold clamping step.

However, there is occasionally a case where the ejector pin is pierced into a molded product, thereby leaving the molded product adhered to and unremoved from the surface of the mold. In such a case, it is impossible according to the conventional control system to recognize the existence of the molded product on the front surface of mold. Therefore, if the next mold clamping operation is performed under such an abnormal condition, the molded product is caught between the pair of dies, thus leading to damage of the mold.

With a view to prevent such an accident, there has been proposed a malfunction-detecting system which is based on image processing. This system however is accompanied with drawbacks that the installation cost thereof is high, and that a delicate adjustment of illumination, etc. is required for obtaining a clear image, thereby making it troublesome in handling the system.

BRIEF SUMMARY OF THE INVENTION

This invention has been accomplished in view of overcoming the problems accompanied with the conventional malfunction-detecting method in the ejecting step of the conventional injection molding machine. Therefore, an object of this invention is to provide a malfunction-detecting method which makes it possible to reliably detect malfunctions in the ejecting step without rendering the injection molding machine more complicated.

Namely, this invention provides a malfunction-detecting method in electric injection molding machines, in which a molded product is removed from a mold by using an ejector pin in an ejecting step, the method comprising the steps of:

storing in advance a relationship between time and torque of an ejector pin driving motor as a reference pattern, the relationship having been obtained from good results in the removal of the molded product;

presetting a tolerance limit of the reference pattern with respect to the value of the torque; and monitoring a pattern of the torque, relative to time, during the ejecting step, and generating an alarm at the time when the value of the torque falls outside the tolerance limit.

The malfunction-detecting method of this invention to detect a malfunction in an injection molding machine is based on the following principle. Namely, when, for instance, the ejector pin is pierced into a molded product, thus leaving the molded product adhered to and unremoved from the surface of the mold in the ejecting step after the releasing of the mold, the torque of the ejector pin-driving motor is of an abnormal value. Therefore, when a pattern indicating this abnormal value of torque is compared with the normal torque pattern, the occurrence of a malfunction in the ejecting step can be easily detected.

Further, even when the cavity of the mold is under-filled or over-filled, part of a molded product may be adhered to and unremoved from the surface of the mold. Even in this case, the torque of the ejector pin driving motor is of an abnormal value, so that the occurrence of a malfunction in the ejecting step can be reliably detected.

Preferably, a time interval for monitoring the torque pattern of the ejector pin driving motor relative to the time in the ejecting step is possible to be preset by the operator.

By doing so, it becomes possible for the operator to optionally preset in advance, as a monitoring interval, a region where the changes of torque are relatively mild in the torque pattern in the normal operation of the ejecting step, or a region where a pattern peculiar to the generation of various kinds of malfunction is likely to be manifested. As a result, the accuracy in detection of a malfunction can be improved.

Incidentally, the aforementioned malfunction-detecting method can also be applied to a hydraulic injection molding machine in the same manner as that of the electric injection molding machine. In this case however, the pattern to be monitored would be a pattern of the hydraulic pressure of the ejector pin-driving hydraulic pump instead of the pattern of torque of the ejector pin-driving motor.

Incidentally, the aforementioned "time" refers to the time elapsed from the start of the ejecting operation. Instead of using this "time", either the position of the ejector pin, or the rotation angle of motor for driving the ejector pin can be also utilized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

DETAILED DESCRIPTION OF THE INVENTION

Figure 1:
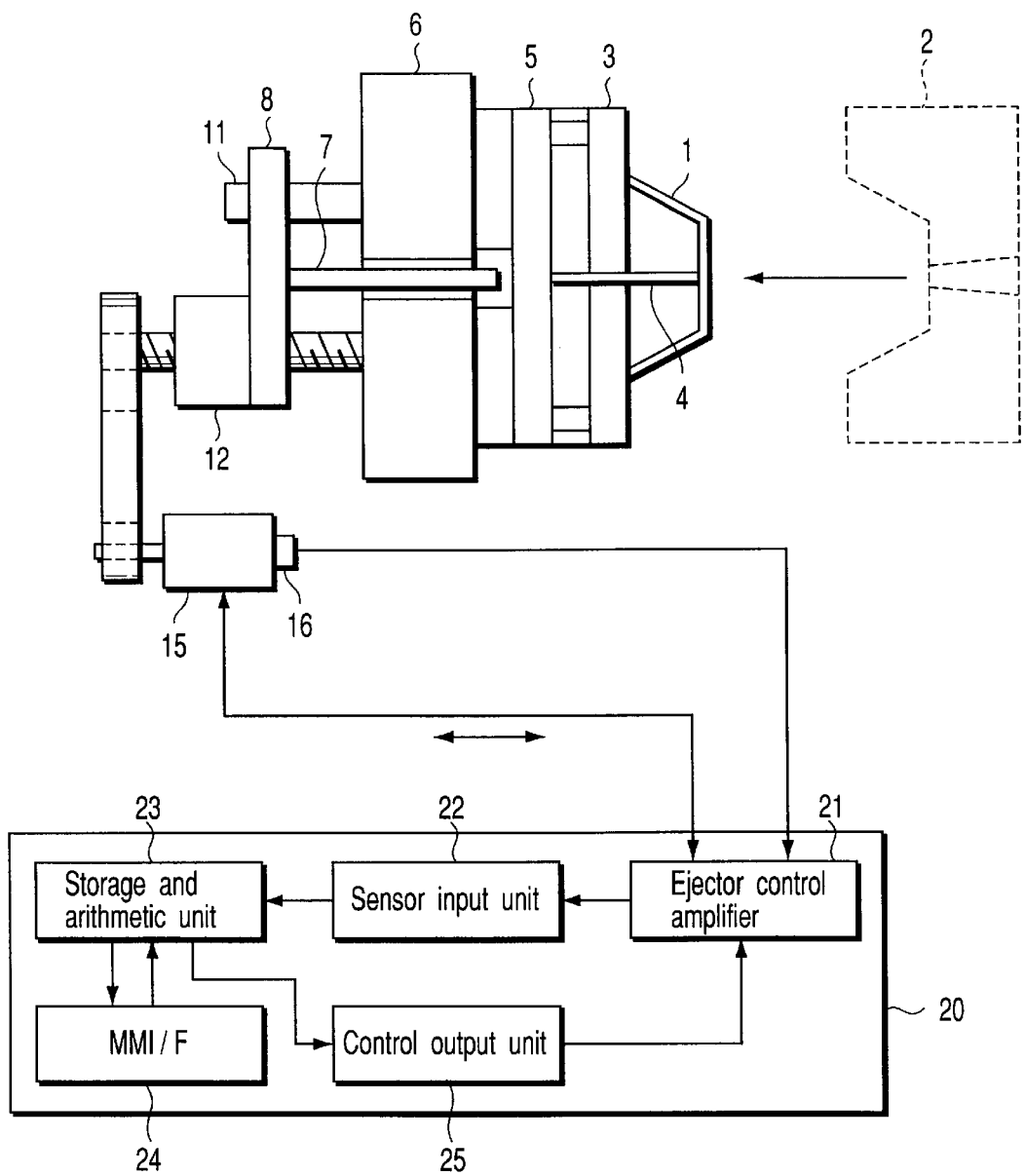
FIG. 1 is a schematic diagram illustrating a electric injection molding machine to which the malfunction-detecting method according to this invention is applied.

FIG. 1 schematically illustrates a motorized injection molding machine to which the malfunction-detecting method according to this invention is applied. In FIG. 1, the reference number 1 represents a molded product, 2 represents a fixed die, 3 represents a movable die, 4 represents an ejector pin, 6 represents a movable platen, 15 represents a servo motor (driving motor), and 20 represents a control system.

The movable die 3 is held on the front surface of the movable platen 6. The movable die 3 is provided at the central axis thereof with a through-hole, into which the ejector pin 4 is slidably incorporated. An ejector plate 5 is interposed between the movable die 3 and the movable platen 6, and is held movably in the axial direction thereof in front of the movable platen 6. The rear end of the ejector pin 4 is fixed to a central portion of the ejector plate 5.

The movable platen 6 is provided at the central axis thereof with a through-hole, into which a connecting rod 7 is slidably incorporated. On the rear side of the movable platen 6, there is disposed a connecting plate 8 which is held movably in the axial direction thereof behind the movable platen 6 via a supporting rod 11 and a feed screw 12. The rear end of the connecting rod 7 is fixed to a central portion of the connecting plate 8. This feed screw 12 is connected, via a gear wheel, with the servo motor 15. The position of the connecting plate 8 (and the connecting rod 7) can be measured on the basis of the output of a rotation angle detector 16 attached to the servo motor 15.

According to this injection molding machine, after the setting of the resin filled in a cavity between the fixed die 2 and the movable die 3, the movable die 3 is retracted to thereby release the mold. The molded product 1 is left adhered onto the front surface of the movable die 3. Thereafter, by making use of the servo motor 15, the connecting rod 7 is actuated so as to protrude the ejector pin 4 from the inner wall of the movable die 3. As a result, the molded product 1 is pushed out of the mold and recovered.

The distance the ejector pin 4 is ejected to push and recover the molded product 1 can be measured from the output of the rotation angle detector 16. On the other hand, the force to protrude the ejector pin 4 can be measured from the driving torque of the servo motor 15 (therefore, from the driving current).

The control system 20 for driving the ejector pin 4 is constituted by an ejector control amplifier 21, a sensor input unit 22, a storage and arithmetic unit 23, an MMI/F (man-machine interface) 24, and a control output unit 25. The ejector control amplifier 21 functions to take up the driving torque and rotation angle of the servo motor 15 employed for driving the ejector pin 4 and also to control the operation of the servo motor 15. The sensor input unit 22 functions to send the data of the driving torque and rotation angle of the servo motor 15 that have been transmitted thereto from the ejector control amplifier 21 to the storage and arithmetic unit 23. This storage and arithmetic unit 23 functions to determine the driving conditions of the servo motor 15 on the basis of the instruction that has been input via the man-machine interface 24 by the operator, and to send a command to the control output unit 25. This control output unit 25 functions to send a control signal to the ejector control amplifier 21 to thereby control the servo motor 15.

Next, the malfunction-detecting method will be explained that is employed to remove the molded product 1 from the movable die 3 by ejecting the ejector pin 4 in the electric injection molding machine shown in FIG. 1.

Figure 2:
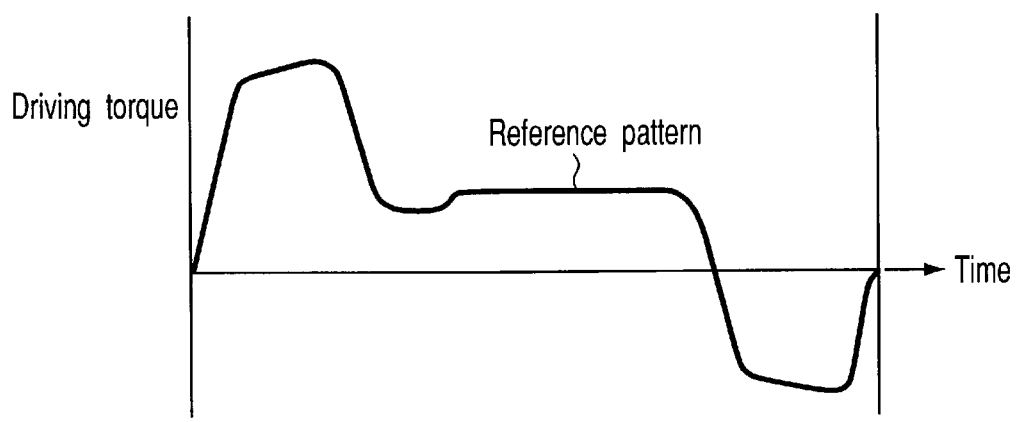
FIG. 2 is a graph illustrating one example of the reference pattern of "time to driving torque" in the ejecting step.

First of all, the relationship of the time to driving torque when good result has been achieved in the removal of the molded product, is stored as a reference pattern. FIG. 2 shows one example of such a reference pattern. Incidentally, in FIG. 2, the starting point of an ejecting operation lies at the origin of abscissa (time-axis).

Figure 3:
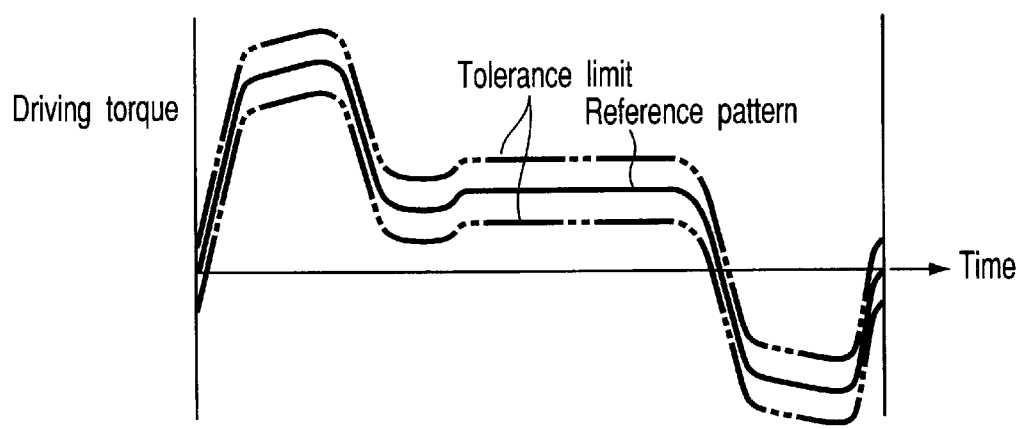
FIG. 3 is a graph illustrating one example of a tolerance limit of the driving torque to be set in the ejecting step.

Then, as shown in FIG. 3, the tolerance limit of the driving torque relative to the reference pattern is preset. When the value of the driving torque falls outside the aforementioned tolerance limit in any moment during the ejecting step, it is judged as a malfunction and therefore, an alarm is generated to call the operator's attention to the malfunction, thereby making it possible to stop the machine in a safe state.

Figure 4:
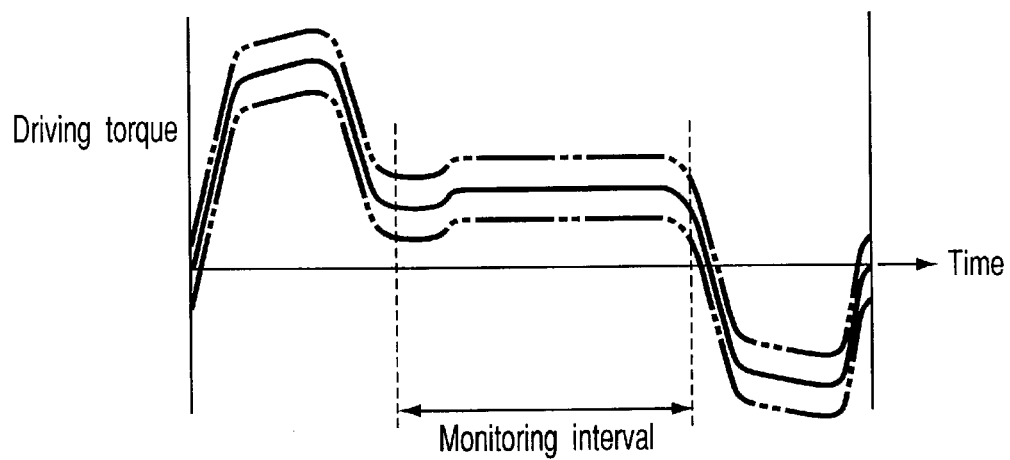
FIG. 4 is a graph illustrating one example of a monitoring interval of the driving torque to be set in the ejecting step.

Incidentally, as shown in FIG. 4, it is possible for the operator to optionally preset a time interval (i.e. monitoring interval) on the time-axis which enables the aforementioned malfunction-detecting function to work in the ejecting step. By doing so, it becomes possible for the operator to optionally preset in advance, as a monitoring interval, a region where the changes of torque are relatively mild in the torque pattern in the normal operation of the ejecting step, or a region where a pattern peculiar to the generation of various kinds of malfunction is likely to be manifested. As a result, the influence of noise can be minimized, and the accuracy in detection of a malfunction can be improved.

Figure 5:
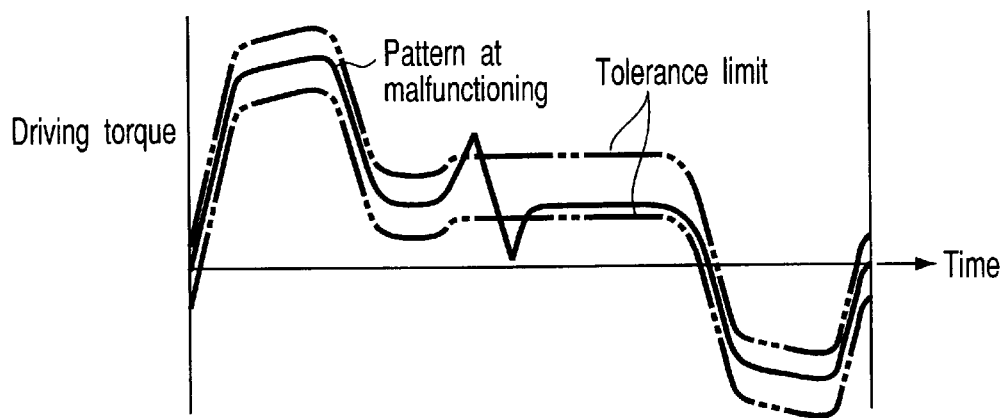
FIG. 5 is a graph illustrating one example of the pattern of "time to driving torque" when a malfunction has occurred in the ejecting step.

FIG. 5 shows one example of the pattern of "time to driving torque" when a malfunction has been detected in the ejecting step. According to this example, when the ejector pin 4 is pierced through the molded product 1, an abnormal peak can be recognized in the driving torque.

Incidentally, although the foregoing explanation is limited to the case where this invention is applied to the electric injection molding machine, the malfunction-detecting method of this invention can be also applied to a hydraulic injection molding machine in the same manner as explained above. In this case however, the pattern to be monitored would be a pattern of the hydraulic pressure of the ejector pin-driving hydraulic pump instead of the pattern of torque of the ejector pin-driving motor.

Incidentally, in FIGS. 2 to 5, the abscissa thereof may represent the position of the connecting plate 8 instead of the time. In this case, as shown in FIG. 2, the reference pattern of the driving torque of servo motor relative to the position should be stored, and as shown in FIG. 3, the tolerance limit of the driving torque relative to this reference pattern should be preset. Therefore, if the interval on the position-axis which enables the aforementioned malfunction-detecting function to work in the ejecting step, is preset in advance by the operator as shown in FIG. 4, the generation of an abnormal peak in the driving torque can be readily detected as shown in FIG. 5.

As explained above, it is possible, according to the method of this invention, to reliably detect a malfunction in the ejecting step of the injection molding machine without rendering the injection molding machine more complicated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A malfunction-detecting method in hydraulic injection molding machines, in which a molded product is removed from a mold by using an ejector pin in an ejecting step, said method comprising the steps of:

storing in advance a relationship between time and hydraulic pressure of an ejector pin-driving hydraulic pump as a reference pattern, said relationship having been obtained from good results in the removal of the molded product;

presetting a tolerance limit of the hydraulic pressure with respect to said reference pattern; and monitoring a pattern of said hydraulic pressure relative to time during the ejecting step, and generating an alarm at the time when the value of said hydraulic pressure falls outside said tolerance limit.

2. The malfunction-detecting method according to claim 1, wherein a time interval for monitoring the hydraulic pressure pattern relative to the time in the ejecting step is preset by an operator.

3. A malfunction-detecting method in electric injection molding machines, in which a molded product is removed from a mold by using an ejector pin in an ejecting step, said method comprising the steps of:

storing in advance a relationship between the position of ejector pin or the rotational angle of an ejector pin driving motor and torque of the ejector pin driving motor as a reference pattern, said relationship having been obtained from good results in the removal of the molded product;

presetting a tolerance limit of the torque with respect to said reference pattern; and monitoring a pattern of said torque, relative to said position or said rotational angle during the ejecting step, and generating an alarm at the time when the value of said torque falls outside said tolerance limit.

4. The malfunction-detecting method according to claim 3, wherein an interval for monitoring the torque pattern relative to said position or said rotational angle in the ejecting step is preset by an operator.

5. A malfunction-detecting method in hydraulic injection molding machines, in which a molded product is removed from a mold by using of an ejector pin in an ejecting step, said method comprising the steps of:

storing in advance a relationship between the position of ejector pin and hydraulic pressure of an ejector pin-driving hydraulic pump as a reference pattern, said relationship having been obtained from good results in the removal of the molded product;

presetting a tolerance limit of the hydraulic pressure with respect to said reference pattern; and monitoring a pattern of said hydraulic pressure, relative to said position, during the ejecting step, and generating an alarm at the time when the value of said hydraulic pressure falls outside said tolerance limit.

6. The malfunction-detecting method according to claim 5, wherein an interval for monitoring the pattern of said hydraulic pressure relative to said position in the ejecting step is preset by an operator.

* * * * *